United States Patent

[11] 3,624,262

[72] Inventor Allan F. Greenwade
 1918 North 25th Pl., Phoenix, Ariz. 85008
[21] Appl. No. 878,516
[22] Filed Nov. 20, 1969
[45] Patented Nov. 30, 1971

[54] AVIATION TRAINING AID
 6 Claims, 2 Drawing Figs.
[52] U.S. Cl. ................................................. 35/10.2,
 35/12 F
[51] Int. Cl. ..................................................... G09b 9/02
[50] Field of Search ........................................ 35/10.2, 12
 P, 12 F; 346/8; 33/204, 215, 216; 74/61, 87, 573;
 248/325

[56] References Cited
 UNITED STATES PATENTS
 2,510,580  6/1950  Kail ............................... 35/10.2
 2,532,974  12/1950  Warner .......................... 35/10.2

Primary Examiner—Malcolm A. Morrison
Assistant Examiner—Jerry Smith
Attorney—Drummond, Cahill & Phillips ABSTRACT: A training aid for simulating the actions of a magnetic compass under various flight conditions, including a pedestal extending upwardly from a base for supporting a compass wheel rotatably mounted thereon. A weight is suspended on a flexible cord from said compass wheel and a guide member extends from the pedestal. The flexible cord passes through an eyelet formed in the end of the guide member, thereby limiting the rotational movement of the compass wheel about the pedestal. A compass window is simulated through the utilization of a rigid sheet of material having an opening therein; the simulated compass window is positionable about the compass wheel by mounting the window frame for pivotal movement about the pedestal. The simulated compass window is provided with a lubber line.

PATENTED NOV 30 1971 3,624,262

INVENTOR.
ALLAN F. GREENWADE
BY
Drummond, Cahill & Phillips
ATTORNEYS

AVIATION TRAINING AID

The present invention pertains to pilot training devices, and more particularly, to a training aid for simulating the actions of a magnetic compass under various flight conditions.

A compass mounted in an aircraft represents one of the most reliable means for navigation to be found in the cockpit; however, magnetic compasses exhibit a variety of idiosyncrasies which can be quite confusing. When instructing student pilots in the utilization of the magnetic compass, it sometimes is difficult to explain the behavior of the magnetic compass as it will occur in flight. For example, when the aircraft is in a northerly or southerly heading and a turn to an easterly or westerly heading is desired, the compass will not give a correct indication of the turn while the turn is being made. Similarly, when the aircraft is in an easterly or westerly heading and the craft experiences an acceleration or deceleration, the indication of the magnetic compass will be disturbed and an erroneous indication of a turn will be given. It is, of course, possible to describe these errors to a student prior to his experiencing these idiosyncrasies in an aircraft; however, during actual flight conditions, the student is usually too preoccupied with numerous other cockpit chores to fully comprehend the behavior of the magnetic compass. Attempts to explain the behavior of the magnetic compass while on the ground rarely results in more than simple memorization on the part of the student that certain actions result in certain behavior of the magnetic compass. When this stereotyped memorization is inculcated in the student, it may serve as an aid to understanding the behavior of his compass, but more than likely will confuse him when actual conditions are incurred.

It is therefore an object of the present invention to provide a training aid to assist the instruction of student pilots in the behavior of an airborne magnetic compass.

It is another object of the present invention to provide a training aid to enable a student pilot to simulate the actions of a magnetic compass in flight.

It is still another object of the present invention to provide a simple and reliable simulator to enable a student to comprehend the behavior of a magnetic compass under certain flight conditions.

These and other objects of the present invention will become apparent to those skilled in the art as the description thereof proceeds.

Briefly, in accordance with the embodiment chosen for illustration, a simple magnetic compass simulator is constructed without the utilization of magnetic materials. A base is formed and a pedestal is extended upwardly therefrom. A simulated compass card (which may be greatly enlarged) is mounted for limited rotational movement about the pedestal. A weight is suspended by a flexible cord from the compass wheel while the cord passes through an eyelet formed in a stationary guide member. In the embodiment chosen for illustration, the guide member is nonrotatably mounted on the pedestal and extends radially outwardly therefrom to perform its function in combination with the weight-supporting cord. A flat sheet of metal or other rigid material is formed with an opening therein to simulate a compass window; the compass window is supported for pivotal movement about the pedestal and for movement about the periphery of the compass wheel. In this manner, the student may view that portion of the compass wheel corresponding to the direction in which the aircraft is headed. To even more closely simulate the actual conditions existing in an aircraft, a lubber line is provided in the window.

The present invention may more readily be described by reference to the accompanying drawings, in which.

Figure 2:
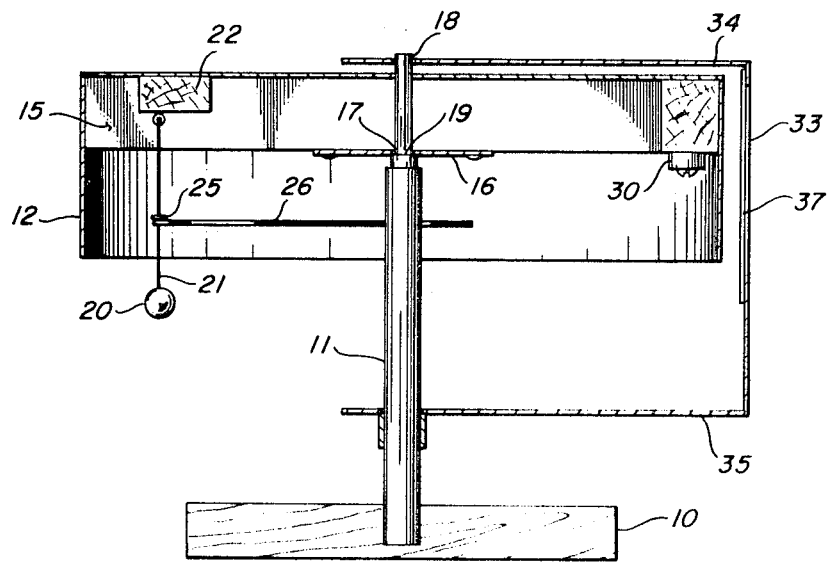
FIG. 2 is a cross-sectional view taken along line 2—2 of FIG. 1.

It will be unnecessary to discuss the variations existing in the earth's lines of magnetic force and which vary in accordance with the geographical location at which the magnetic course is being measured. Also, the inherent errors existing in the magnetic compass because of the magnetic materials found in proximity thereto (known as magnetic deviation) will not be discussed. The first error to which the aircraft-mounted magnetic compass is subject, and the error in which most difficulty is experienced, is frequently referred to as the northerly turning error. The northerly turning error exhibits itself in the form of an erroneous indication during a turn when the aircraft is heading either north or south or a northerly or southerly course. For example, when the aircraft is in a northerly heading and a turn is made to the east or west, the compass will lag the actual direction of the aircraft by approximately 30° (temperate latitudes of the Northern Hemisphere). This error will vary in magnitude from 30° when the aircraft is headed north to 0° when it is headed east or west. The indication in the magnetic compass window to the pilot as soon as the turn is entered is that he is making a turn in the wrong direction. Conversely, when the aircraft is in a southerly heading, a turn easterly or westerly will be accompanied by an indication in the magnetic compass window that the aircraft is making an extremely fast turn; in fact, the turn indicated by the magnetic compass will be approximately 30° in advance of the actual turn. If the aircraft is in either an easterly or westerly course, there will be no appreciable lead or lag in the compass and a turn will result in a proximate correct indication in the magnetic compass window.

The next substantial error exhibited by the magnetic compass is the acceleration error. When the aircraft is in an easterly or westerly heading, an acceleration of the aircraft results in the compass erroneously indicating that it is more northerly than the correct magnetic heading. Conversely, when the aircraft is in an easterly or westerly heading and the aircraft is decelerated, the magnetic compass erroneously indicates a magnetic course more southerly than the true magnetic course. The acceleration forces cause a dip in the suspended compass parts resulting in the above erroneous indications.

As mentioned previously, simply memorizing the above rules does not suffice, since it tends to confuse the student when he first encounters these idiosyncrasies under actual flight conditions.

Referring now to the drawings, the apparatus of the present invention includes a base 10 which supports a pedestal 11 extending vertically upwardly therefrom. A compass wheel 12 (including the usual directional indications of a compass card), is rotatably mounted on the pedestal 11 such as through the utilization of compass wheel frame members 14 and 15 which extend diametrically across the compass wheel and provide a means for attachment of a plate 16 having an opening 17 therein to receive the top portion 18 of the pedestal 11. The plate 16 thus bears against the shoulder 19 formed in the pedestal. It will be obvious to those skilled in the art that numerous methods may be used for mounting the compass wheel for rotation about a vertical axis.

A weight 20 is suspended on a flexible cord 21 which is secured to a crossbar 22. The cord 21 passes through an eyelet 25 formed in the end of a rodlike guide member 26. The guide member 26 is nonrotatably mounted and, in the embodiment chosen for illustration, is simply mounted through a hole drilled in the pedestal 11. A second weight 30 is mounted in a diametric position relative to the weight 20 secured thereto in any convenient fashion.

A flat plate 32 forms the frame of a compass window 33 and may be provided with integrally formed perpendicularly extending legs 34 and 35 which are mounted for pivotal movement about the pedestal 11. Again, it will be obvious to those skilled in the art that enumerable arrangements may be utilized to provide a means for positioning the window 33 at any convenient position about the periphery of the compass wheel 12. A lubber line 37 is provided in the window 33 for accurately aligning the theoretical axis of the aircraft with the direction exhibited in the window on the compass wheel. A metal pointer such as that shown at 40 may be mounted on top of the compass wheel to demonstrate the fact that the compass wheel is always magnetically oriented except during those periods of disturbance described above.

Figure 1:
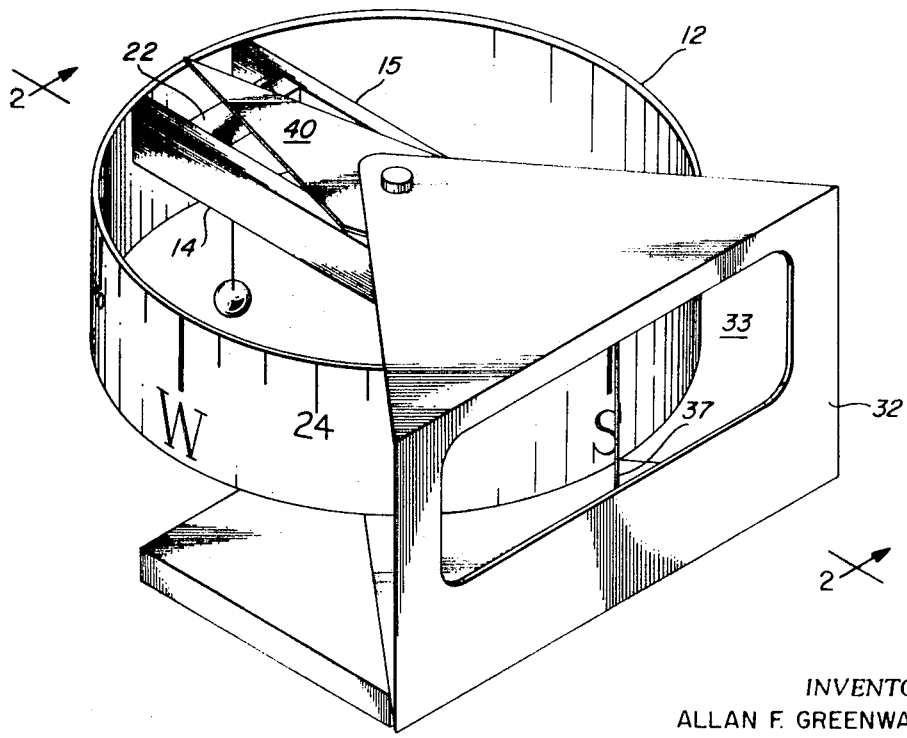
FIG. 1 is a perspective view of a training aid constructed in accordance with the teachings of the present invention.

The operation of the present invention may now be described. Assuming that it is desired to demonstrate the acceleration error of the magnetic compass in an aircraft on a southerly heading, the compass window 33 is pivoted about the pedestal 11 until the lubber line 37 coincides with the south indication on the compass wheel. This positioning of the respective elements is illustrated in FIG. 1. In this configuration, it may be seen that while acceleration of deceleration of the aircraft may be simulated by tipping the base 10 and pedestal 11 away from or toward the student, the tipping motion will not result in any motion of the compass wheel. If the lubber line coincides with the east or west heading, acceleration or deceleration may be simulated by tipping the base 10 forward (acceleration) or rearward (deceleration); in either of these directions, the weight 30 overcomes the tension on the cord 21 to move the compass wheel to demonstrate the corresponding acceleration or deceleration error.

To demonstrate the northerly turning error of the magnetic compass, we, for example, may assume the aircraft is on an easterly heading and it is desired to turn to a southerly heading, the student will place the lubber line over the East indication on the compass wheel and then bank the apparatus to the right, thus simulating a right bank in the aircraft to come around to the southerly heading. Thus far, no movement of the compass wheel is experienced and the behavior of the instrument is identical to the real magnetic compass when the real aircraft makes such a movement. As the aircraft moves about the compass (the compass wheel remains substantially stationary during a turn and the aircraft actually turns about the compass), the base of the present apparatus is rotated (while holding plate 32, and thus lubber line 37, stationary) until the south heading is shown under the lubber line. As the base is rotated, the weight 30 overcomes the tension of the cord 21 to slightly rotate the compass wheel. The action of the weight 30 thus results in either greater or less rotation of the compass wheel than is imparted to the pedestal upon which it is mounted. When the pedestal is righted, the weight 30 is ineffective and the cord 21 tends again to assume a vertical position. It may therefore be readily demonstrated to the student that the turn to the south must be terminated 30° short of the actual desired direction because as soon as the turn is terminated, the northerly turning error of the compass caused by the lead of 30° will be eliminated by the tension on the cord 21 from the weight 20. The northerly turning error to a northerly course will similarly be demonstrated. In this manner, the student fixes a mental picture in his mind precisely what to expect when in flight and also readily learns that under these circumstances to come about to a particular heading he must either roll out of the turn before or after the desired heading to account for the lead or lag in the magnetic compass.

To demonstrate acceleration errors, it was previously noted that with the apparatus set in accordance with FIG. 1, no effect would be exhibited by the compass reading because of an acceleration or deceleration to the aircraft. If the window 33 is pivoted about the compass wheel so that, for example, a westerly direction was indicated, a simulated acceleration of the apparatus by tipping the base 10 forward would result in a displacement of the weight 30 against the tension in the cord 21 caused by the weight 20. The view through the compass window would therefore temporarily indicate a northerly turn which, of course, would be in error since the aircraft was following a westerly course and merely accelerating. If the aircraft were to decelerate, the motion imparted to the compass wheel by the weight 30 would indicate a southerly turn which again would, of course, be in error since the aircraft was merely following a westerly course and decelerating.

It may therefore be seen that the instrument of the present invention provides a simulation of an aircraft magnetic compass and the actions of the compass under various flight conditions. The apparatus utilizes no magnetized or magnetizable material and provides the simulation through novel mechanical means utilizing weights strategically placed on a simulated compass wheel. It will be obvious to those skilled in the art that the present invention may be constructed from numerous materials and arranged in a variety of relationships to achieve the temporary displacement of the compass wheel as a result of acceleration, deceleration, or banking. For example, the cord 21 could readily be replaced by a solid shaft pivotally secured to the compass wheel; also, the weights 20 and 30, as well as the positioning of the stationary guide member 26, may be selected to give the magnitude and speed of response desired for maximum instructional value.

I claim:

1. A training aid for simulating the actions of a magnetic compass under various flight conditions comprising: a pedestal; a compass wheel mounted for rotation about an axis on said pedestal; a first weight for imparting rotational force about said axis; support means suspending said first weight from a point on said compass wheel; a stationary guide member positioned between said first weight and said compass wheel; said support means engaging said stationary guide member whereby said rotational force is transmitted to said compass wheel but in an opposite direction; and a second weight secured to said compass wheel and positioned diametrically to the point of suspension of said first weight.

2. The combination set forth in claim 1, wherein said first weight is suspended by a flexible cord passing through said stationary guide member.

3. The combination set forth in claim 2, wherein said stationary guide member comprises a rigid rod, nonrotatably secured to said pedestal, having an eyelet formed in an end thereof through which said flexible cord passes.

4. The combination set forth in claim 2, wherein said stationary guide member comprises a rigid rod nonrotatably secured to said pedestal having an eyelet formed in an end thereof through which flexible cord passes, and including means defining a window, having a lubber line therein, mounted for pivotal movement about said compass wheel.

5. The combination set forth in claim 1, wherein said stationary guide member is nonrotatably secured to said pedestal and extends radially outwardly therefrom.

6. The combination set forth in claim 1, including means defining a window, having a lubber line therein, mounted for pivotal movement about said compass wheel.

* * * * *